US006838981B2

(12) United States Patent
Zoratti

(10) Patent No.: US 6,838,981 B2
(45) Date of Patent: Jan. 4, 2005

(54) STOPPED OBJECT FILTERING FOR SIDE OBJECT DETECTION SYSTEM

(75) Inventor: Paul K. Zoratti, South Lyon, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 47 days.

(21) Appl. No.: 10/402,836

(22) Filed: Mar. 28, 2003

(65) Prior Publication Data

US 2004/0189451 A1 Sep. 30, 2004

(51) Int. Cl.$^7$ ................................................ B60Q 1/00
(52) U.S. Cl. ...................... 340/435; 340/436; 340/903; 342/70; 701/301
(58) Field of Search ................................. 340/435, 436, 340/441, 903; 701/301; 342/27, 301, 28

(56) References Cited

U.S. PATENT DOCUMENTS

| | | | |
|---|---|---|---|
| 5,325,096 A | | 6/1994 | Pakett |
| 5,339,075 A | | 8/1994 | Abst et al. |
| 5,517,196 A | * | 5/1996 | Pakett et al. ................... 342/70 |
| 5,631,639 A | * | 5/1997 | Hibino et al. ............... 340/903 |
| 6,243,024 B1 | | 6/2001 | Yamabuchi et al. |
| 6,265,968 B1 | | 7/2001 | Betzitza et al. |
| 6,400,308 B1 | | 6/2002 | Bell et al. |
| 6,509,863 B2 | | 1/2003 | Zoratti et al. |
| 2003/0025597 A1 | | 2/2003 | Schofield |

* cited by examiner

*Primary Examiner*—Jeffery Nofsass
*Assistant Examiner*—Eric Blount
(74) *Attorney, Agent, or Firm*—MacMillan, Sobanski & Todd LLC

(57) ABSTRACT

An object-presence alert is given to a driver by a vehicular side-object detection system in response to a remote sensor for sensing objects in a predetermined zone of interest along side a vehicle. The zone of interest includes a front region and a rear region, and the remote sensor provides sensor data to generate a set of localized detection points. When detection points are sensed in the zone of interest, then a plurality of respective sets of detection points are collected at successive sample times. For each of the sets of detection points, a tracking type of the object within the zone of interest is determined in comparison to a speed of the vehicle and the object is classified as either a moving vehicle or a stationary object in response to the tracking type and in response to locations of the detection points in the zone of interest. If the object first appeared in a region other than the front region, then a short observation period is selected including a first predetermined number of sets of detection points and otherwise a long detection period is selected including a second predetermined number of sets of detection points longer than the first predetermined number. A number of times that the object is classified as a moving vehicle within the selected observation period is compared to a predetermined percentage threshold and the alert is initiated if classified as a moving vehicle for greater than the predetermined percentage threshold.

10 Claims, 13 Drawing Sheets

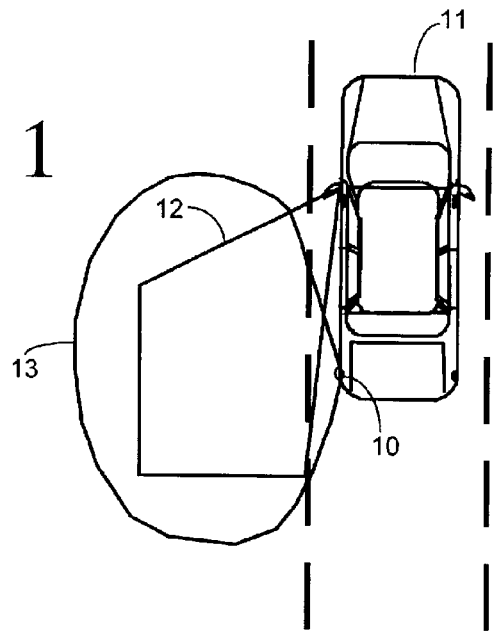
Fig. 1
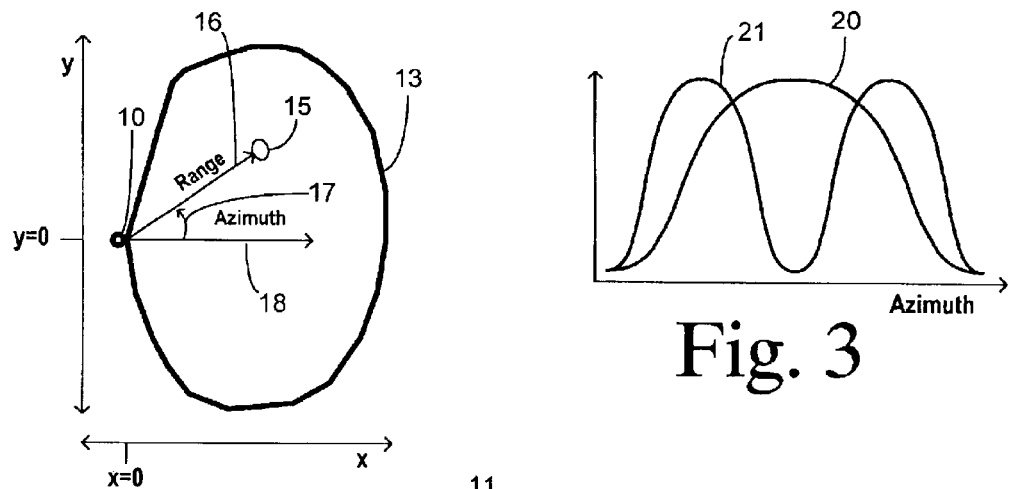
Fig. 2
Fig. 3
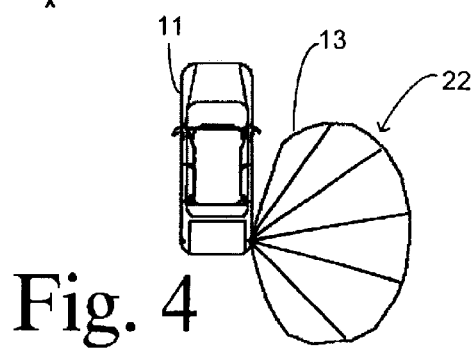
Fig. 4

STOPPED OBJECT FILTERING FOR SIDE OBJECT DETECTION SYSTEM

CROSS REFERENCE TO RELATED APPLICATIONS

This application is related to co-pending U.S. application Ser. No. 10/401,428 entitled "System and Method for Determining Object Location from Side-Looking Sensor Data," and U.S. application Ser. No. 10/402,043 entitled "Method for Determining Object Classification from Side-Looking Sensor Data," both filed concurrently herewith and incorporated herein by reference in their entirety.

STATEMENT REGARDING FEDERALLY SPONSORED RESEARCH

Not Applicable.

BACKGROUND OF THE INVENTION

The present invention relates in general to side object detection systems for motor vehicles, and, more specifically, to distinguishing between stationary and moving objects within a detection zone.

Automotive systems known as side object detection systems (SODS) utilize "side-looking" remote sensors for such applications as blind-spot detection and lane change aid. These applications are designed to alert the driver to potential hazards, e.g., objects that may be located adjacent to the host vehicle. The remote sensors may employ radar transceivers, light sensors, ultrasonic sensors, and other technologies.

One objective of the side-looking sensors is to identify the presence and location of objects within a predetermined zone of interest adjacent to the vehicle. Radar sensors detect and locate objects by transmitting electromagnetic energy which reflects off of objects within the sensor field-of-view. The reflected signal returns to the radar sensor where it is processed to determine the round-trip travel time of the transmitted/received energy. The round trip travel time is directly proportional to the range of the target from the radar sensor. In addition to range determination, there are methods to determine azimuth (i.e. cross-range) location of detected objects such as multiple scanned/switched beams and monopulse implementations. Therefore, depending upon its complexity, the radar is capable of locating objects in both range and azimuth relative to the sensor location.

Based on the location of detected objects, an automatic system must decide whether a detection is one for which it should alert the driver. Under certain conditions, it may be undesirable to always generate an alert every time that any object is detected in the detection zone. For example, side-looking radar sensors will be subjected to reflections from common roadway structures such as guard-rails and roadside signs. These objects may not constitute a threat to which the driver desires to be alerted since they are stationary.

Radar sensors are capable of providing accurate range measurements to objects located within the sensors' field-of-view. In some cases, the sensor may also provide range rate (via Doppler) and azimuth (cross-range) information about the objects. However, due to the complexity of the driving environment, it has not been possible for a radar sensor to discriminate between the various driving scenarios without extensive processing and expensive sensor designs. It would be desirable to discriminate between objects for which an alert should or should not be provided using relatively simple sensors and without excessive computational resources.

SUMMARY OF THE INVENTION

This invention describes methods for enhancing side-looking radar sensor design and signal processing to identify and discriminate between a variety of driving scenarios. With the driving scenario properly identified, higher level system decisions (e.g., whether to alert a driver or activate a restraint mechanism) can be properly made.

In one aspect of the invention, a method is provided for controlling an object-presence alert in a vehicular side-object detection system in response to a remote sensor for sensing objects in a predetermined zone of interest along side a vehicle. The zone of interest includes a front region and a rear region, and the remote sensor provides sensor data to generate a set of localized detection points. When detection points are sensed in the zone of interest, then a plurality of respective sets of detection points are collected at successive sample times. For each of the sets of detection points, a tracking type of the object within the zone of interest is determined in comparison to a speed of the vehicle and the object is classified as either a moving vehicle or a stationary object in response to the tracking type and in response to locations of the detection points in the zone of interest. If the object first appeared in a region other than the front region, then a short observation period is selected including a first predetermined number of sets of detection points and otherwise a long detection period is selected including a second predetermined number of sets of detection points longer than the first predetermined number. A number of times that the object is classified as a moving vehicle within the selected observation period is compared to a predetermined percentage threshold and the alert is initiated if classified as a moving vehicle for greater than the predetermined percentage threshold.

BRIEF DESCRIPTION OF THE DRAWINGS

FIG. 1 is an overhead view showing a side-object detection zone of interest and a remote sensor field of view.

FIG. 2 shows coordinate systems for specifying locations within a field of view.

FIG. 3 illustrates monopulse radar transmission beams covering a field of view.

FIG. 4 illustrates a scanning/multiple switched beam radar transmission covering the field of view.

DETAILED DESCRIPTION OF PREFERRED EMBODIMENTS

Figure 5:
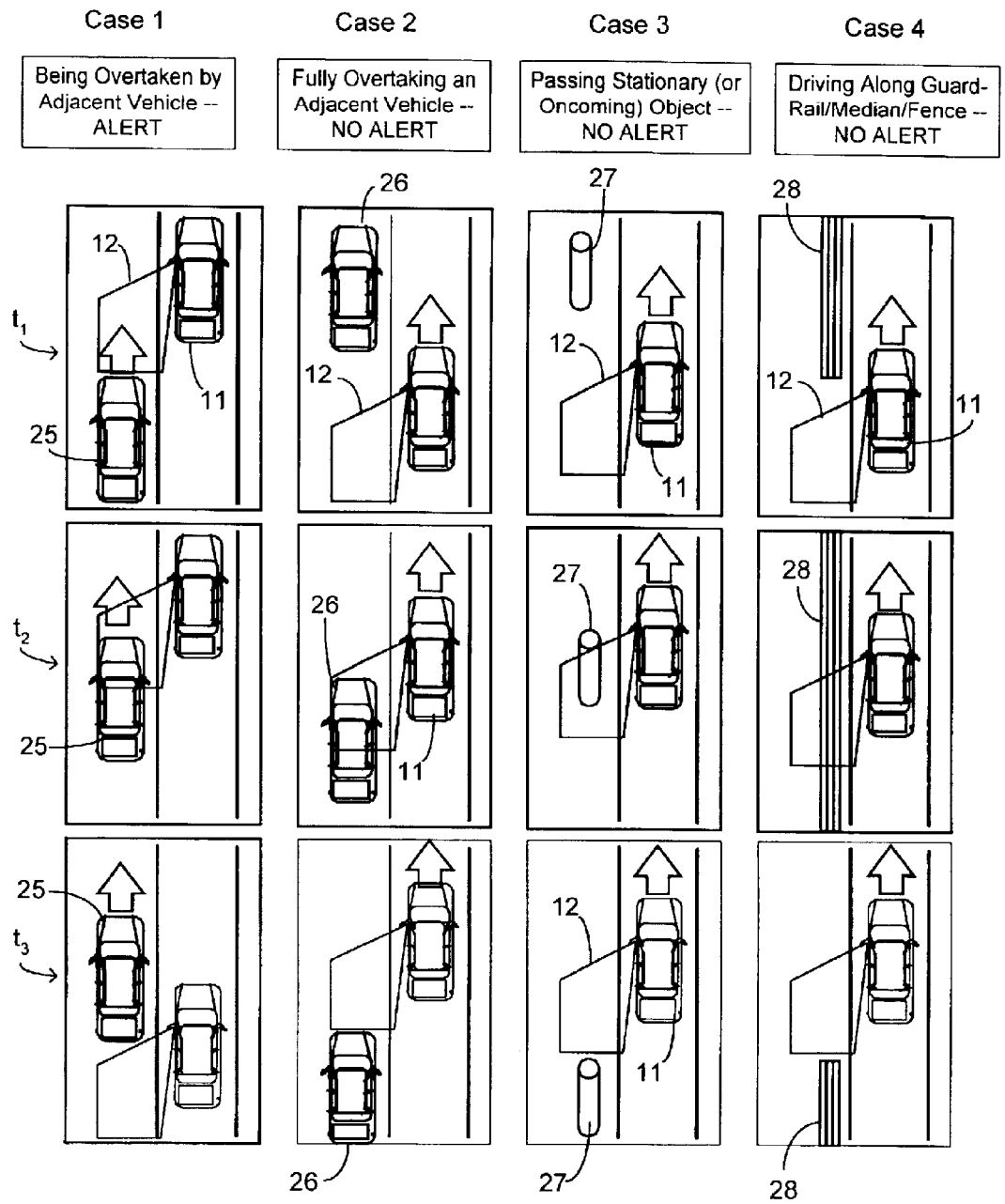
FIG. 5 is a graphic depiction showing various driving scenarios wherein objects are detected by a side-object detection system.

Referring to FIG. 1, a remote sensor 10 is mounted towards the rear of a vehicle 11 and is pointed generally in a direction perpendicular to the vehicle's direction of travel (i.e., the sensor is side-looking). By measuring range and bearing (or azimuth) to detected targets (i.e., sensed detection points) the side obstacle detection system can determine if an object is located within a zone of interest 12, also known as a detection zone. Sensor 10 typically has an actual field of view 13 which may encompass areas beyond zone of interest 12. Although a zone of interest is shown on only one side of vehicle 11, a typical side object detection system includes sensors deployed on both the left and right sides of a vehicle in order to cover blind spots on both sides of vehicle 11.

Sensor 10 may be comprised of a radar sensor, for example, and is capable of supplying at least two types of information: 1) range to detected targets, and 2) bearing (i.e., azimuth angle) to detected targets. As an added piece of information, the measurement of relative range rate via Doppler frequency shift can be utilized. The use of Doppler measurements has been used to identify stopped objects using a radar sensor, however, it is of limited value in a side-looking case since the radar's field of view is generally perpendicular to the vehicle's direction of travel and any Doppler shift is minimal for objects in the zone of interest.

As shown in FIG. 2, when a detection point or target 15 is sensed within the sensor's field of view 13, a range 16 from sensor 10 and an azimuth angle 17 from a reference direction 18 (e.g., perpendicular from the side of vehicle 11) are determined using methods well known in the art in accordance with the type of remote sensor being employed. In a preferred embodiment of the invention, the coordinates of detection points are converted into X/Y Cartesian coordinates with the x dimension corresponding to perpendicular distance from a corresponding side of the vehicle and with the y dimension corresponding to parallel distance from a reference point, such as the position of the remote sensor.

In a preferred embodiment, targets are detected and localized using monopulse radar. An example beam pattern is shown in FIG. 3. A single-lobed radar pulse is transmitted and received alternately with a two-lobed radar pulse 21. As is known in the art, by comparing the reflection time (i.e., range) of target detections with the relative amplitudes of target detections at the same range, individual detection points can be located.

In an alternative embodiment shown in FIG. 4, a multiple beam radar sensor generates separate detection beams 22 directed at respective slices within field of view 13. A narrow radar beam or other beams such as a laser beam can also be electronically scanned across the field of view so that the beam direction at the time of detection directly gives the azimuth angle.

When a sufficient number of detection points have been sensed, the presence of an object in the zone of interest can be reliably determined. In some conditions, however, it is not usually desirable to initiate an alert (e.g., lighting a warning light or sounding an alarm) for every possible type of object that may be detected. In particular, stationary objects approach the vehicle from a forward direction within the driver's vision and no warning may be necessary or desired.

In general, there are two types of stationary objects that may enter the zone of interest: 1) those which are relatively short and spread over a small azimuth angle, such as sign posts, poles, and bridge pillars, and 2) those which have relatively wide longitudinal extent, such as concrete medians, guardrails, continuous roadside "clutter" such as groups of trees or berms. A challenge not satisfactorily met by the prior art is the need to distinguish stationary objects from moving vehicles in the zone of interest.

Various driving scenarios are shown in FIG. 5. In Case 1, vehicle 11 is overtaken by a faster moving vehicle 25. Thus, at a time $t_1$, vehicle 25 is approaching the rear edge of zone of interest 12. At a time $t_2$, vehicle 25 has entered zone 12 and is detected as an object within zone 12. By a time $t_3$, vehicle 25 has emerged from the front edge of zone 12 and is visible to the driver of vehicle 11. During the times that vehicle 25 is within zone 12, it is desirable to generate an alert notification or warning to the driver of vehicle 11.

In Case 2, vehicle 11 overtakes a slower moving vehicle 26. At time $t_1$, vehicle 26 is forward of vehicle 11 and can be seen by its driver. At time $t_2$, vehicle 26 is present in zone 12 but should not raise an alert if it is quickly overtaken, i.e., not present in a blind spot for more than a brief period of time. At time $t_3$, vehicle 26 has emerged from zone 12 so that no alert is to be produced.

A scenario involving a stationary object is shown in Case 3 wherein vehicle 11 passes a pole 27 situated off of the road surface. Pole 27 passes or tracks through zone 12 even more quickly than vehicle 26 since pole 27 has no forward motion. Since pole 27 does not constitute a hazard to vehicle 11, no alert should be initiated when it is present within zone 12.

Case 4 shows another scenario wherein a stationary object is comprised of a long structure such as a guardrail, a fence, or a roadway median. Vehicle 11 approaches a guardrail 28 at time $t_1$ and travels alongside guardrail 28 for a long distance as at time $t_2$. Eventually, vehicle 11 clears guardrail 28 at time $t_3$. No alert should be initiated for any such long, stationary structure.

Since the surfaces of any sensed objects may be irregular and can provide inconsistent return signals (e.g., the strength of radar reflections from a point on an object can be very sensitive to the angle of the incident radar waves), the sensed detection points in each of the foregoing scenarios are inherently noisy thereby making it difficult to distinguish one type of object from another. Specialized, high cost sensors and/or complex, resource intensive computer processing have previously been needed for classifying objects using remote sensor data. The present invention overcomes these difficulties using inexpensive sensors and processing together with an improved decision methodology as shown in FIG. 6 for filtering out stationary objects so that an alert/warning is not initiated unless an object is reliably classified as a moving vehicle.

Figure 6:
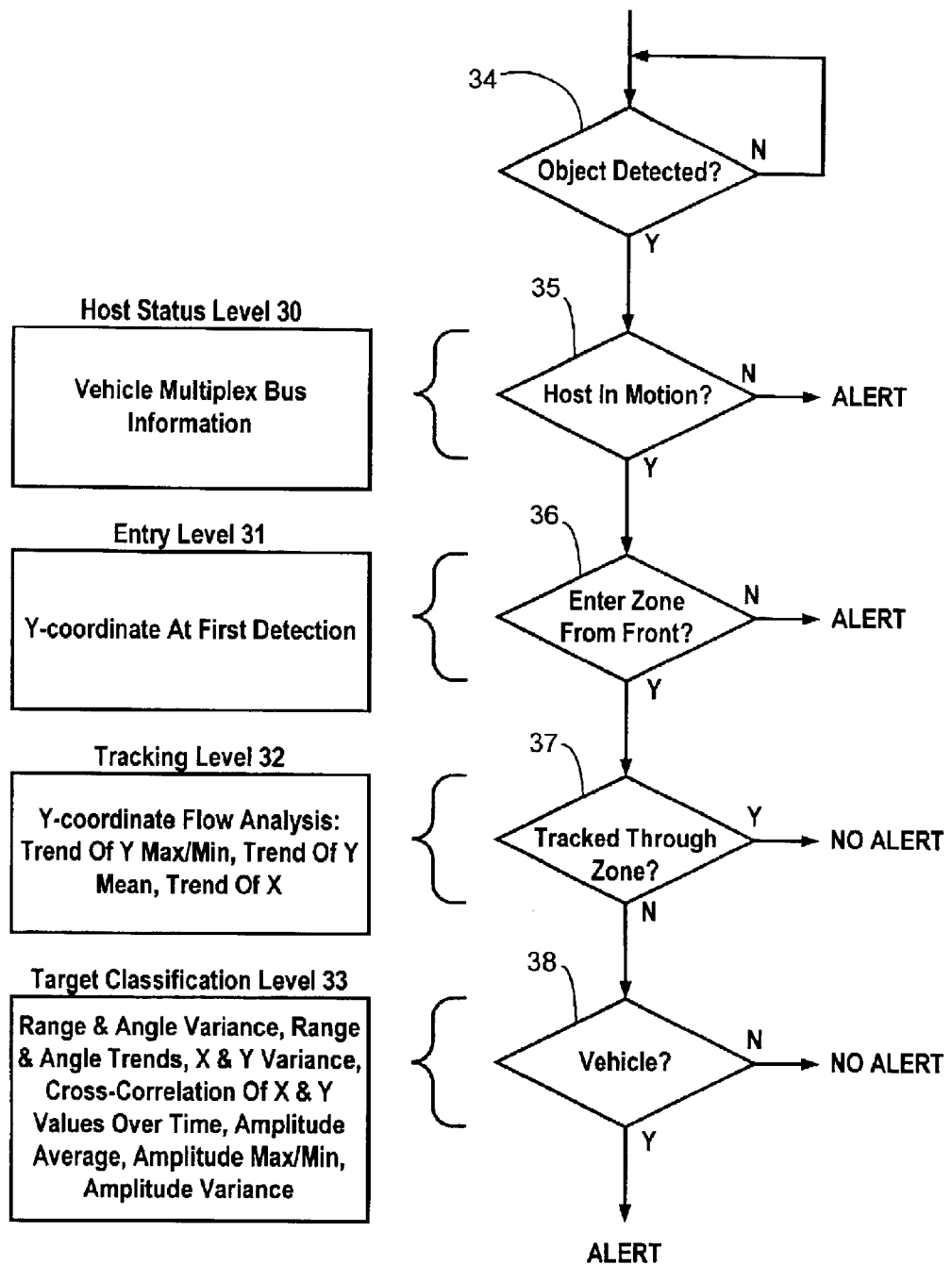
FIG. 6 is a flowchart showing an overall and decision tree for determining whether to generate an alert to the driver of a vehicle.

A preferred decision tree of the present invention shown in FIG. 6 includes a plurality of decision levels 30 through 33 for providing an alert when another vehicle may be moving within a zone of interest (e.g., blind spot) of a vehicle but suppressing an alert for any other types of (e.g., stationary) objects. The method of FIG. 6 begins with a check in step 34 to determine whether any object is detected within the zone of interest. Once an object has been detected, a host status level 30 is carried out wherein a check is made in step 35 to determine whether the host vehicle is in motion (e.g., is traveling with a speed over a speed threshold). If the vehicle is not in motion or moving at a speed less than the speed threshold, then an alert is produced if any object is detected in the zone of interest. For instance, when a vehicle is parking or just beginning to move, it may be desirable to be alerted when any objects are present. As shown in box 30, a discriminator for the host status level could be vehicle speed information obtained from a vehicle multiplex bus communication with a powertrain control module, for example. In an alternative embodiment, it may be determined by a vehicle manufacturer or driver that no alerts should be given when not in motion. In that case, host status level 30 and step 35 may be skipped.

Once a host vehicle is in motion, further levels of the decision tree are utilized. In entry level 31, a check is made in step 36 to determine whether an object entered the zone of interest from the rear or from the side of the zone (i.e., from other than the front of the zone, such that the object is very likely a moving vehicle and may not have already been seen by the driver). If entry is into the zone is into the rear or side regions of the zone then an alert is initiated. A preferred discriminator for entry level 31 is the Y-coordinate alone to identify entry into a rear region or the X/Y-coordinates to identify a side region entry. When a vehicle is making a sharp turn, it is sometimes possible that a stationary object first enters the side or rear regions of the zone of interest. Thus, an alternate embodiment is provided below wherein the entry region controls the length of an observation period during which an object is classified as a vehicle or a stationary object and wherein a short observation window and a test more slanted toward classifying the object as a vehicle are employed when the object first entered the side or rear regions of the zone of interest.

In a more simplified alternative embodiment, the entry level could be used alone such that 1) an alert is initiated whenever an object enters from the side or rear, and 2) a decision is made not to initiate an alert for an object that enters from the front no matter what that object does within the zone of interest after entering.

In the embodiment of FIG. 6, if an object enters the front region of the zone (or if it is not possible to determine the region of entry), then the decision tree progresses to a tracking level 32. A check is made in step 37 to determine whether the object is tracking through the zone of interest as though it is stationary (or moving in the opposite direction as the host vehicle). If tracking through the zone, then no alert is initiated for the object. Discriminators useful for tracking level 32 include Y-coordinate coordinate flow analysis such as trend of $Y_{max}$, $Y_{min}$, $Y_{mean}$, or X.

If the object does not track through (i.e., remains in) the zone, then an object classification level 33 is entered wherein a determination is made in step 38 whether or not the object is a vehicle. If the object is classified as a vehicle then an alert is generated, otherwise there is no alert. Discriminators for determining whether the detection points correspond to a vehicle include range and angle variance or trends, X and Y variance, cross-correlation of X and Y, X and Y values over time, signal reflection amplitude averages, amplitude maximums and minimums, and amplitude variance.

The present invention may be used in systems employing various sensing technologies with well known signal processing methods to determine sets of detection points at respective sample times (e.g., every 30 milliseconds). The data may be processed using well known general purpose or customized microcontrollers, for example.

Figure 7:
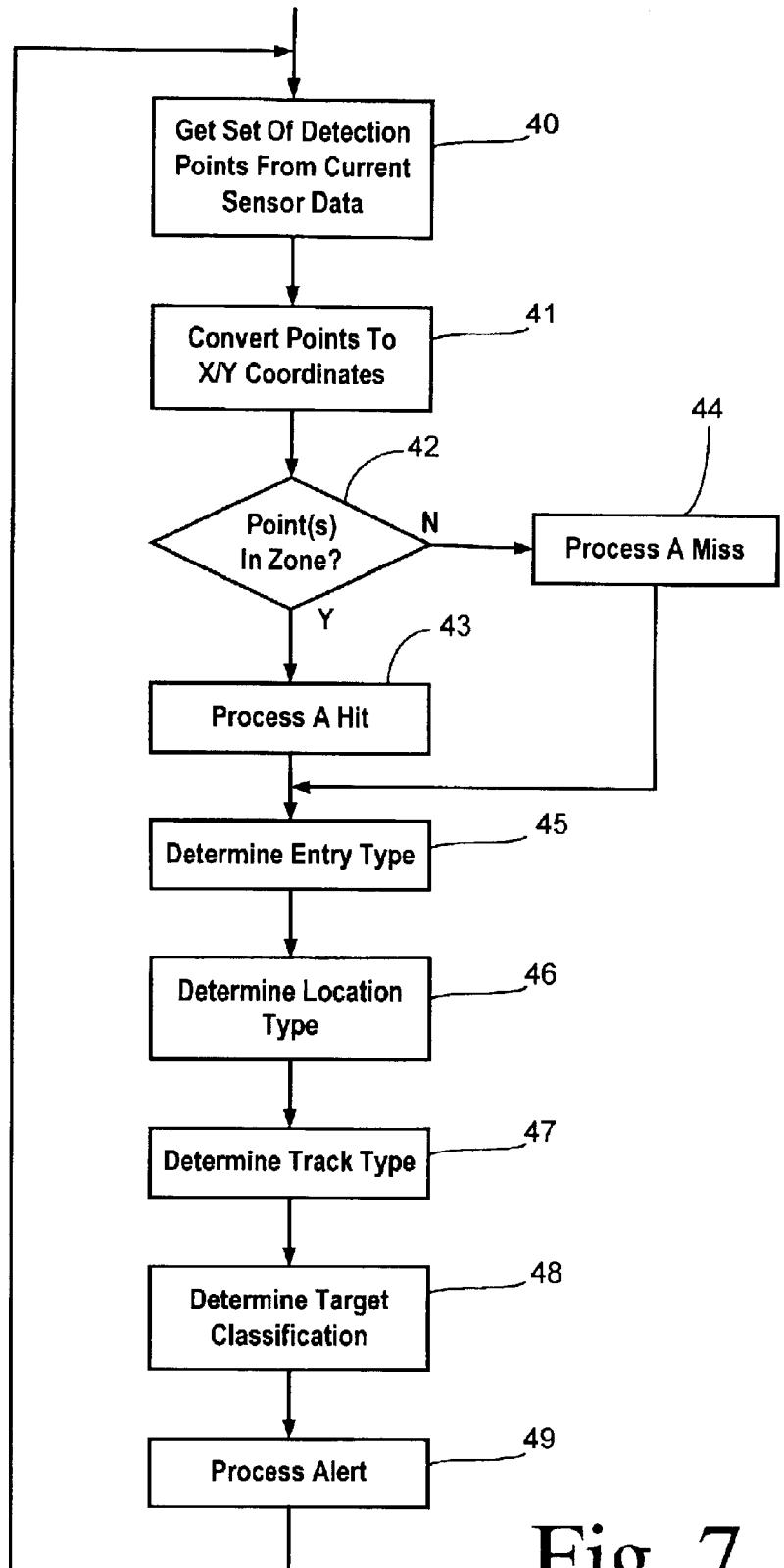
FIG. 7 as a flowchart showing a preferred embodiment of the present invention.

A detailed method for implementation in a controller that is interfaced with a remote sensor module is shown in FIG. 7. This embodiment preferably employs the variable observation period mentioned above. In step 40, a set of detection points at the current sample time are obtained from the remote (e.g., radar) sensor. Since sensor data is typically created in the form of range and azimuth data, the set of detection points is preferably converted to X/Y coordinates in step 41 to simplify some of the subsequent processing. However, conversion to X/Y coordinates is optional since each type of processing can equivalently be conducted using azimuth and range (i.e., polar) coordinates.

A check is made in step 42 to determine whether any detection points have been sensed that are within the zone of interest. If yes, then the point(s) are processed as a hit in step 43; otherwise, they are processed as a miss in step 44. In step 45, an entry type is determined. A location type is determined in step 46 for assisting in the determination of a track type in step 47 and a target classification is determined in step 48. Based on the determinations made in steps 45–48, the status of an alert/warning indication is processed in step 49 and then a return is made to get the next set of detection points in step 40.

Figure 8:
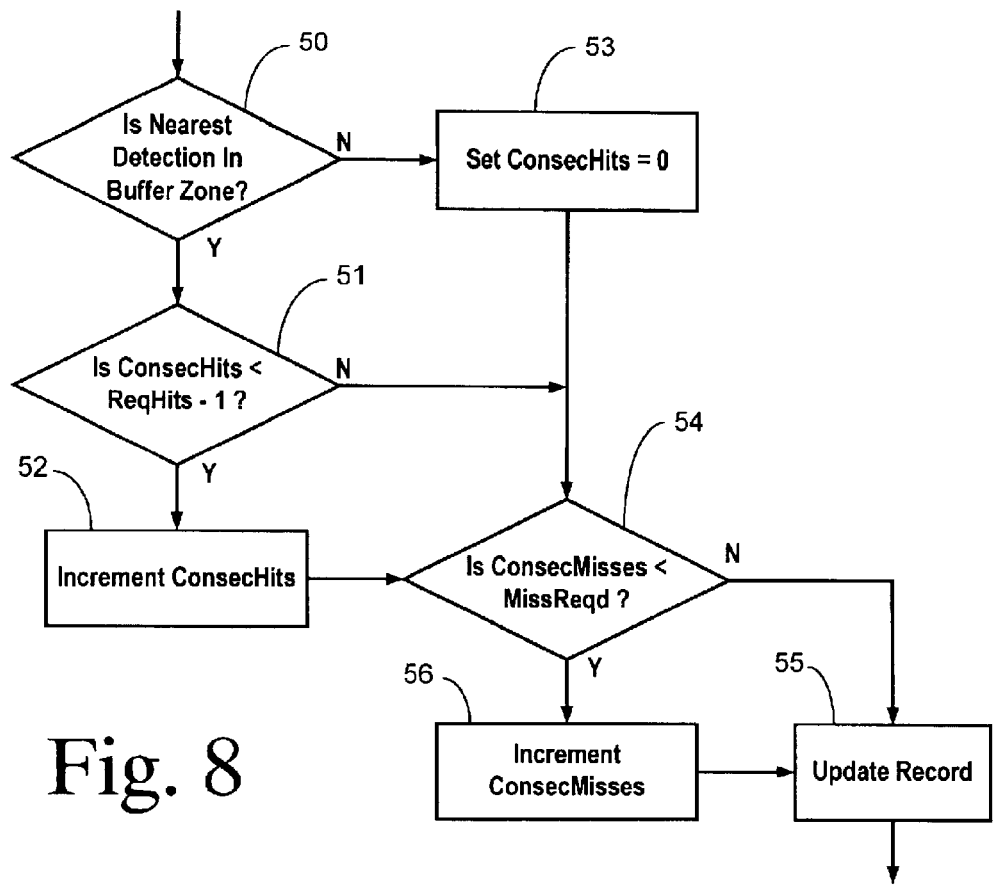
FIG. 8 is a flowchart showing a method for processing a miss in greater detail.

The processing of a miss in step 44 is shown in greater detail in FIG. 8. Due to the random fluctuations of target detections between sample times, the present invention provides for processing of hits and misses so that detections over several consecutive sample times can optionally be considered together. In addition, the presence of target detections within the sensor field-of-view but outside of the actual zone of interest (e.g., greater than one road lane away from the host vehicle) is monitored so that information about an object gathered prior to its crossing into the zone of interest can be utilized.

In step 50, a check is made to determine whether the detection point nearest the remote sensor (i.e., with the smallest range) is within a predetermined buffer area around the zone of interest (i.e., since this is a miss, it cannot be within the zone of interest). The buffer zone is used to track objects just outside the zone of interest so that the necessity of initiating an alert can be detected more quickly if and when the object enters the zone of interest. If in the buffer zone, then a check is made in step 51 to determine whether a counter ConsecHits is less than a predetermined number of required hits ReqHits minus 1 in step 51. If yes, then the current value of ConsecHits is incremented by one in step 52. Otherwise, the value of ConsecHits is unchanged. Thus, if ConsecHits is already equal to the required number of hits ReqHits and a detected object moves out from the zone of interest into the buffer zone, the value of ConsecHits remains at the level of ReqHits. If the object thereafter re-enters the zone of interest, an alert can be initiated more quickly.

If the nearest detection point was found not to be within the buffer zone in step 50, then the value of ConsecHits is reset to zero in step 53. After any updating of ConsecHits in steps 52 or 53, a check is made in step 54 to determine whether a counter ConsecMisses is less than a predetermined number of required misses MissReqd. If not, then any changes made to the counters are stored in a master record in step 55. Such master record is accessed by each of the routines of FIG. 7 during their operation (i.e., the master record includes detection points for a plurality of consecutive sets as well as track type and class type determinations for each set so that these can be retrieved for each selected observation period). If the value of ConsecMisses is less than MissReqd, then ConsecMisses is incremented in step 56 before updating the record in step 55.

Figure 9:
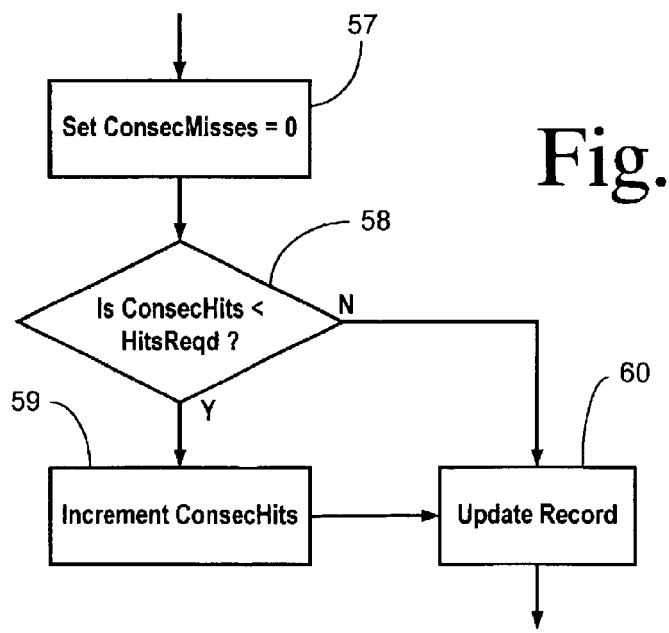
FIG. 9 is a flowchart showing a method for processing a hit in greater detail.

The processing of a hit (i.e., a set of detection points wherein at least one point falls within the zone of interest) is shown in greater detail in FIG. 9. The counter ConsecMisses is reset to zero in step 57. Then a check is made in step 58 to determine whether ConsecHits is less than HitsReqd. If yes, then ConsecHits is incremented in step 59 and the record for the current sample time is updated in step 60. If ConsecHits has already reached HitsReqd, then the record is updated in step 60 without further incrementing ConsecHits. The predetermined value of HitsReqd is selected to ensure that an object is really present and it is not just noisy sensor data. HitsReqd may have a value of about 4, for example. Similarly, the predetermined value of MissReqd ensures that an object has really departed and may also have a value of about 4, for example.

Figure 10:
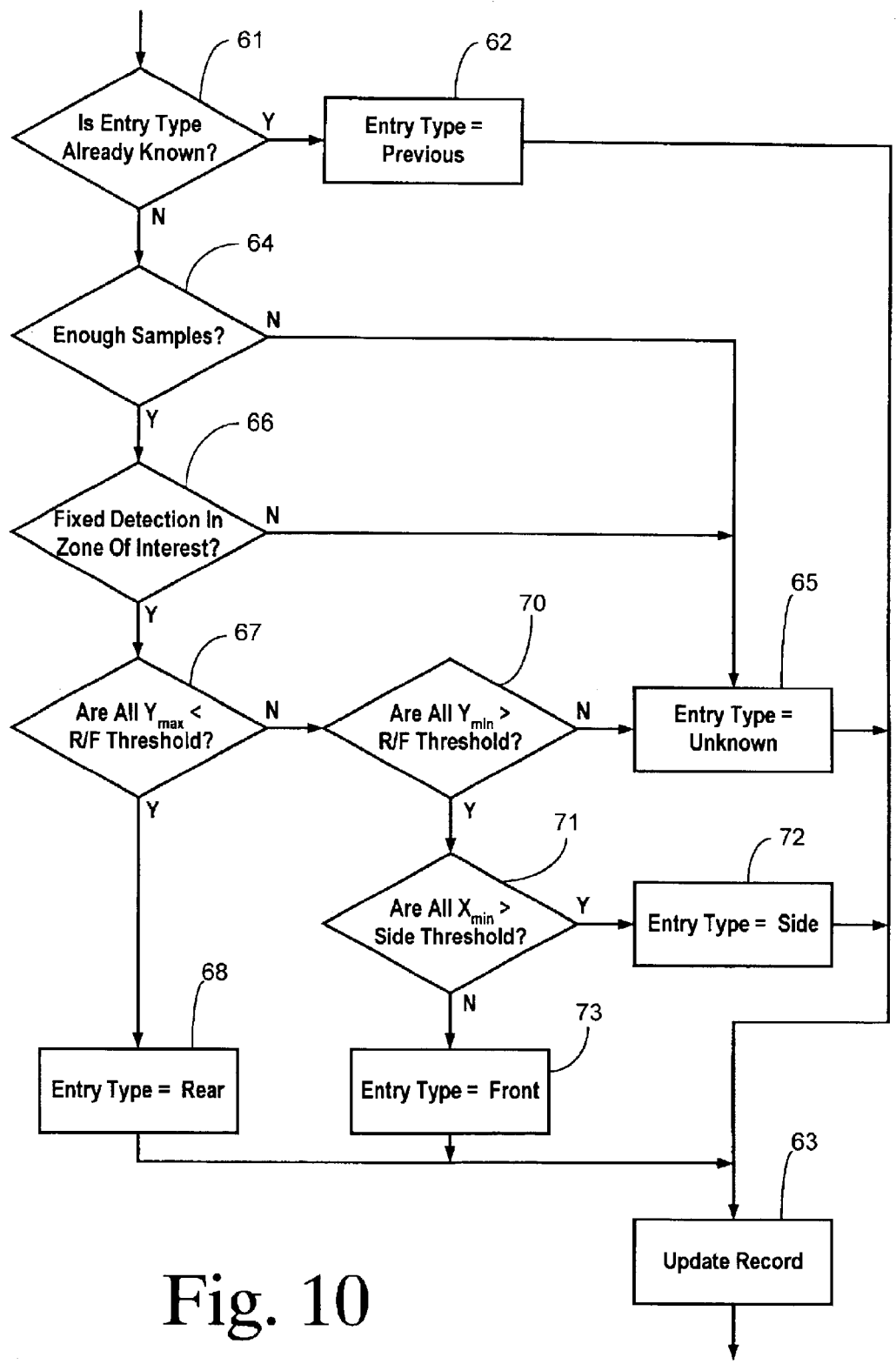
FIG. 10 is a flowchart showing a method for determining an entry type.

The determination of an entry type is shown in FIG. 10. A check is made in step 61 whether an entry type is already known. If so, then the entry type continues to be the original entry type in step 62 and any record updating is performed in step 63. In other words, once an entry type is determined for an object, the entry type does not change as long as an object continues to be present.

Step 64 checks to determine whether enough sets of detection points are available to make a determination of entry type. Preferably two samples should be available, although the present invention also contemplates making a determination with only one sample. If not enough samples are available in the master record, then entry type is set to unknown and the process exits at step 63.

If enough samples are present, then a check is made in step 66 to determine whether any fixed detection points are in the zone of interest. This step may be necessitated according to the type of remote sensor being used. With a monopulse radar, for example, it may be possible to have detection points with a known range but without a resolvable azimuth angle. Therefore, if the only available detection points cannot be fixed within the zone, then entry type is set to unknown in step 65. Otherwise, step 67 checks to determine whether all the $Y_{max}$ values (i.e., each respective $Y_{max}$ value from each respective sample set) are less than a rear/front (R/F) threshold. Thus, if all the farthest forward detection points is each sample set under consideration is rearward of the R/F threshold then the entry type is set to Rear in step 68.

Figure 11:
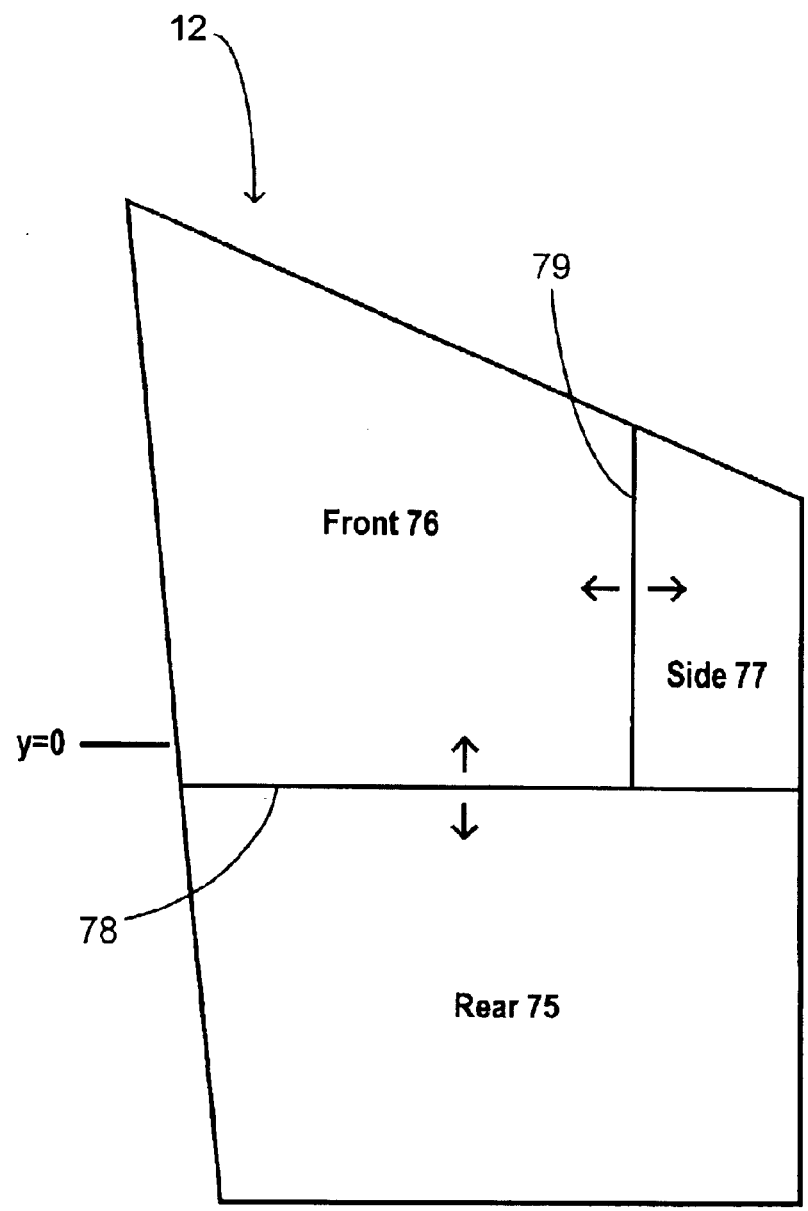
FIG. 11 shows front, side, and rear regions within a zone of interest.

FIG. 11 shows zone 12 including a rear region 75, a front region 76, and a side region 77 as determined by R/F threshold 78 and a front/side (F/S) threshold 79. In a preferred embodiment, at least the R/F threshold is adjusted in response to the speed of the host vehicle since the range of front to back positions at which a stationary object may be first detected increases as the vehicle speed increases. The Y value of the R/F threshold may be determined according to the formula:

$$\text{Threshold} = \text{Limit} - (V \cdot 0.044704 \cdot R \cdot 2)$$

where limit is a beginning (forward) position of the threshold at low speed, V is vehicle speed in KPH, the factor 0.044704 converts from KPH to cm/msec, R is the sensor update rate in msec, and the factor of 2 accounts for the possibility that an object was just outside the zone on a previous sample pulse. A lower limit may be provided below which the Y value is not allowed to go.

Returning to FIG. 10, if there was a $Y_{max}$ value forward of the R/F threshold in step 67, then a check is made in step 70 to determine whether all $Y_{min}$ values are greater than the R/F threshold. If not, then detection points first appeared on both sides of the threshold and the entry type is set to (or remains) unknown in step 65. Otherwise, the entry must now be distinguished between a front and a side entry (i.e., front entry objects should already have been seen by the driver but side entry objects may have come from the driver's blind spot). A check is made in step 71 to determine whether all $X_{min}$ are greater than the F/S threshold. If so, the entry type is set to Side in step 72; otherwise it is set to Front in step 73.

Figure 12:
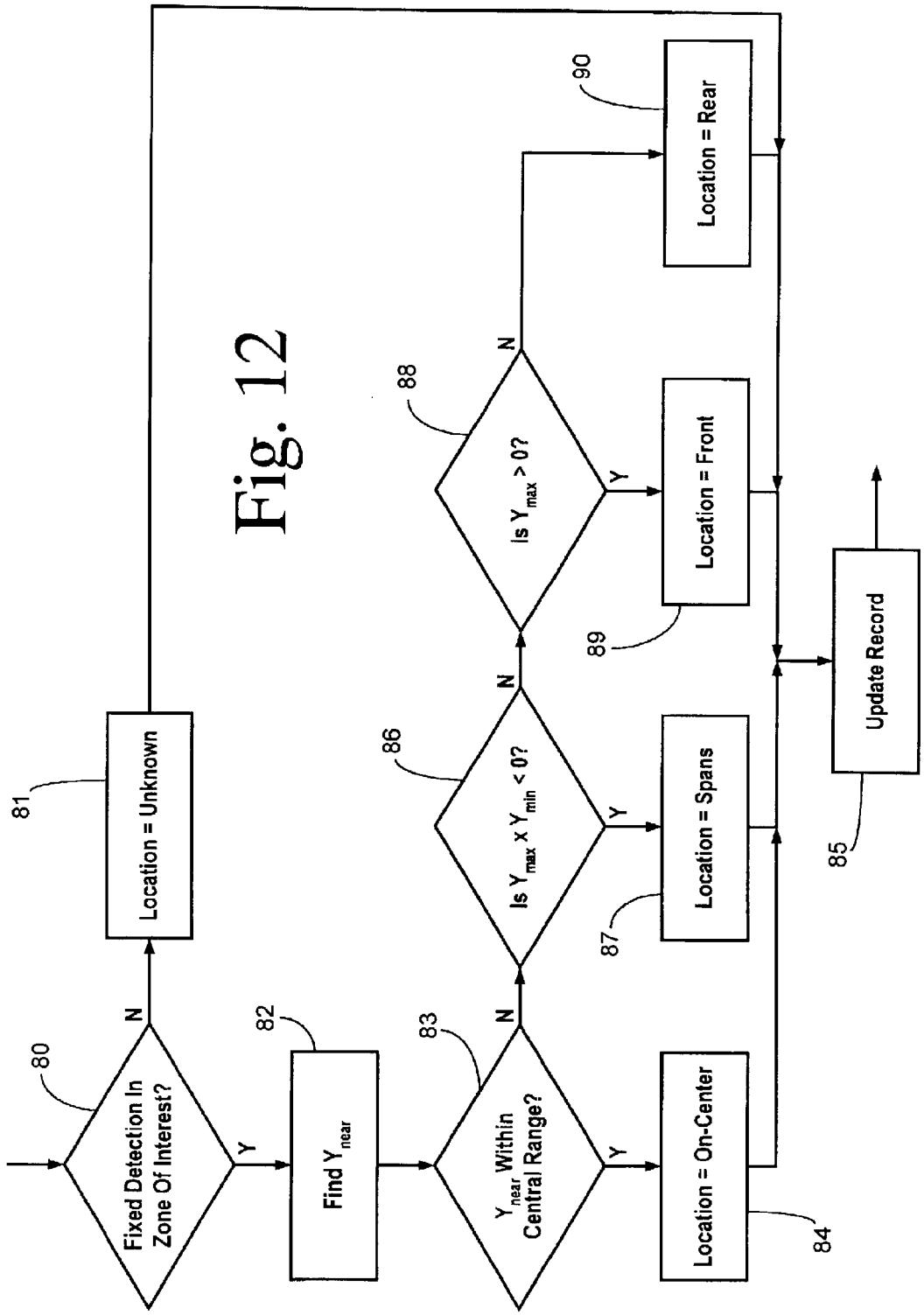
FIG. 12 is a flowchart showing a method for determining a location type.

The process for determining an object location (described in greater detail in co-pending application Ser. No. 10/401,428 is shown in FIG. 12. The location type assists in determining an object track type and/or an object classification type as described below. In step 80, a check is made to determine whether at least one detection point has a fixed location within the zone. If not, then location type is set to unknown in step 81 and the record is updated in step 85.

As long as one fixed detection point is present, then the Y-coordinate value ($Y_{near}$) of the detection point nearest in range to the sensor location (at Y=0) is found in step 82. Generally, objects make their closest approach to the remote sensor when they directly outward from the sensor (i.e., are intersecting a line perpendicular to the host vehicle's direction of travel and originating at the sensor). Thus, a check is made in step 83 to determine whether $Y_{near}$ is within a central range centered on Y=0. If within this threshold range, then the location type is set to On-center in step 84 and the record is updated in step 85.

If $Y_{near}$ is not within the threshold range, then a check is made in step 86 to determine whether $Y_{max}$ multiplied by $Y_{min}$ is less than zero (i.e., whether there are both positive and negative values of Y). If so, then location type is set to Spans in step 87. If not spanning, then step 88 compares any Y value (e.g., $Y_{max}$) with zero to determine whether the location type is Front (step 89) or Rear (step 90).

Figure 13:
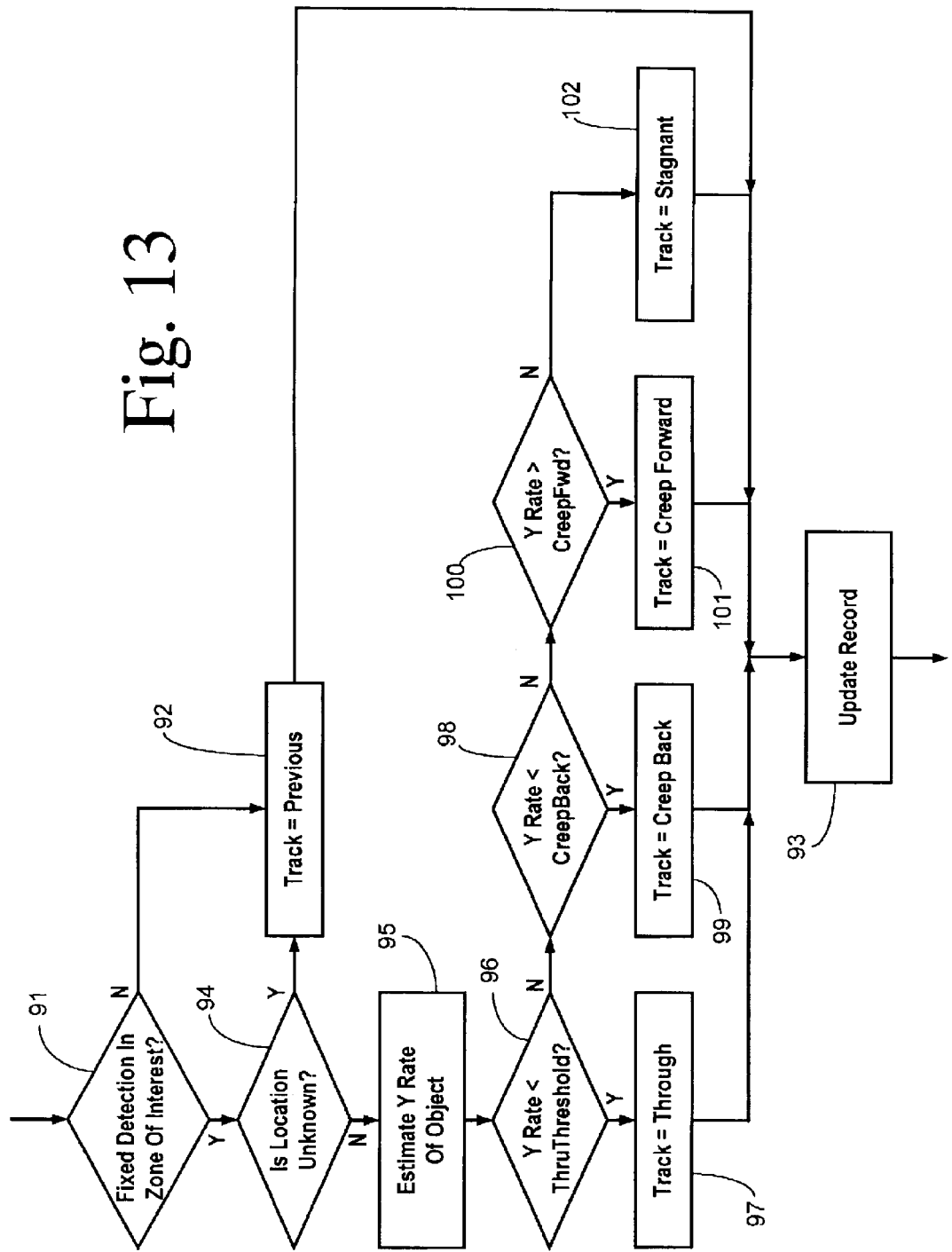
FIG. 13 is a flowchart showing a method for determining a track type.

The track decision level is shown in greater detail in FIG. 13. In step 91, a check is made to determine whether at least one detection point has a fixed location within the zone. If not, then track type is set to its previous value in step 92 and the record is updated in step 93. As long as one fixed detection point is present, then a check is made in step 94 to determine whether a location type is known. If not, then track type remains with its previous value.

If location type is known, then an estimate of the Y-rate of the object (i.e., relative speed as compared to the host vehicle) is determined in step 95. The Y-rate may be estimated by determining the slope of a smoothed $Y_{mean}$ (or $Y_{max}$ or $Y_{min}$) over a plurality of sample times (i.e., sets of detection points). In other words, an average of all the Y values for a set of detection points at one sample time is determined. Then a second such average is determined for one or more subsequent (or previous) sets of detection points. The change in Y divided by the sample time yields the Y-rate. Since a stationary object moves at the same relative speed but in a direction opposite to the vehicle motion, its Y-rate would be negative. Thus, the Y-rate is compared to a ThruThreshold in step 96 and if less than (i.e., more negative than) the threshold then the track type is set to Through in step 97. The tracking threshold may preferably be determined according to a formula:

$$\text{ThruThreshold} = -V \cdot 0.028 \cdot R \cdot \text{ToleranceFactor}$$

wherein the factor of 0.028 converts KPH to cm/msec and ToleranceFactor provides an adjustment to control how closely the rates need to match.

It may be desirable to identify other tracks types of Creep Back, Creep Forward, and Stagnant using other thresholds as shown in steps 98–102.

Figure 14:
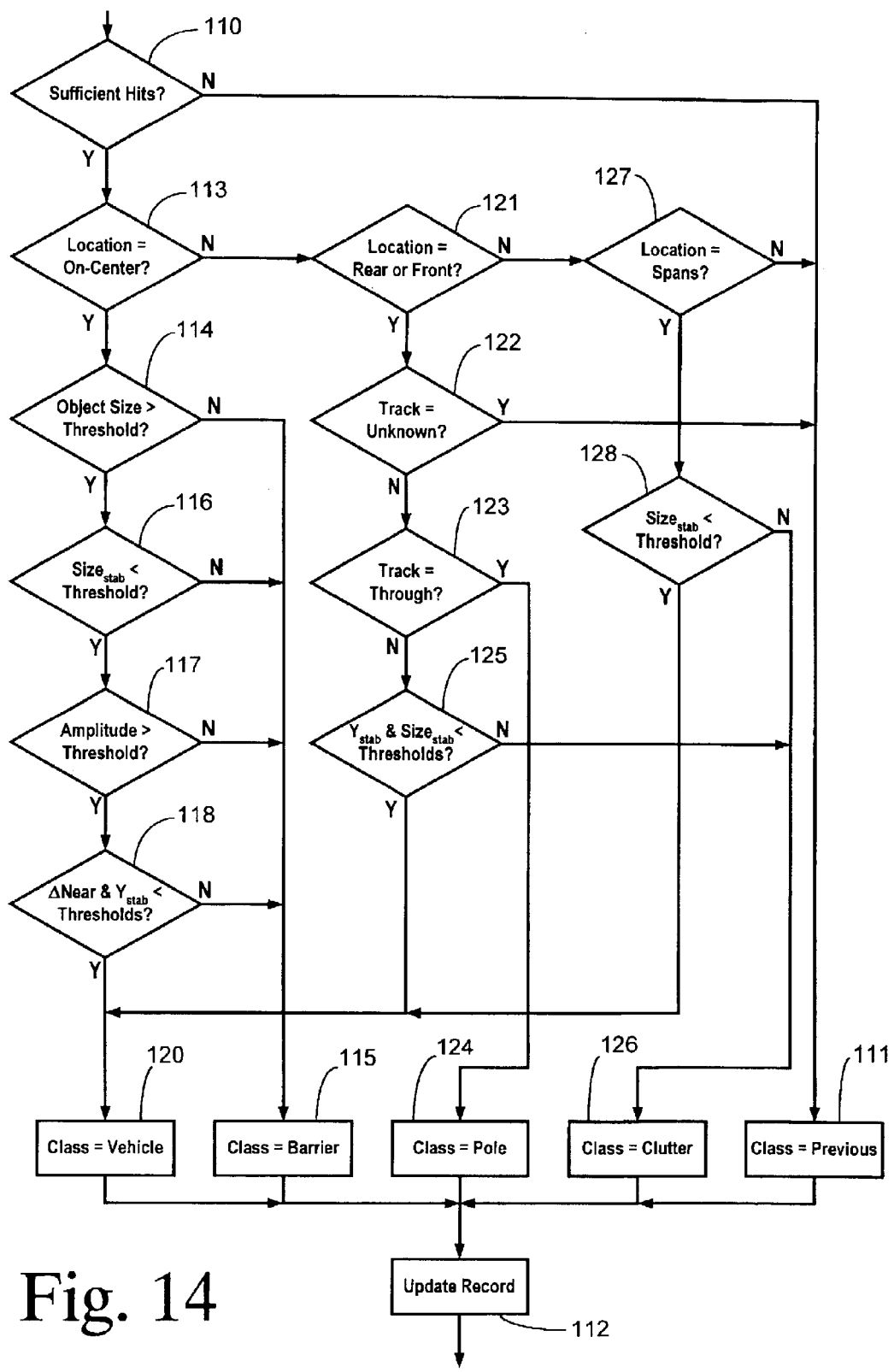
FIG. 14 is a flowchart showing a method for determining a classification type.

The object classification level is shown in greater detail in FIG. 14. The primary goal is to identify a vehicle moving along with the target vehicle, but other classifications such as barrier (e.g., guardrail or fence), small fixed object (e.g., pole), or clutter (e.g., interspersed trees, berms, or multiple small objects) can also be identified.

A check is made in step 110 to determine whether a sufficient number of hits exist to determine a classification. If not, then class type retains its previous value in step 111 and the record is updated in step 112. If sufficient hits have been detected, then the object location type is checked. Thus, step 113 checks whether the location type is On-center. If so, then the object should be either a vehicle directly alongside the host vehicle or a long structure such as a guardrail since these objects are the only ones likely to create a strong specular radar reflection.

If location type is On-center, then a check is made in step 114 to determine whether the object's size is greater than a size threshold. The size (i.e., two-dimensional area) of the object is preferably determined by multiplying the span (i.e, spatial spread) in Y times the span in X (or other suitable orthogonal directions). For example, the size may be determined according to the formula:

$$(Y_{max}-Y_{min}) \cdot (X_{max}-X_{min})$$

The spans in Y and X may be determined over several sets of detection points. If object size is not larger than (i.e., is less than) the size threshold, then the object class is set as Barrier in step 115. Detection points reflected from a barrier, such as a guardrail, will span over a smaller (e.g., thinner) area than points reflected from a vehicle because the reflecting surface of a vehicle is more irregular (e.g., wheel wells, roof panel, glass panels, etc.). Therefore, a larger object size potentially indicates a vehicle.

Otherwise, a check is made in step 116 for comparing the stability of the size value over time with a stability threshold. The stability measure depends on the difference (variance) of the size value from sample time to sample time, so that a higher stability means a lower number. If the stability value is above a stability threshold (i.e., the detected size varies a lot from sample to sample), then the object class is set to Barrier in step 115.

Otherwise, a check is made in step 117 to determine whether an amplitude of sensed detection points is greater than a threshold. In the case of radar sensors, the strongest return signals to the sensor could be expected to come from flat planar and metallic surfaces like those of a vehicle or a guardrail. Step 114 should have already excluded guardrails, so step 117 can be a good indicator of a vehicle when strong amplitude reflections are present. Thus, if amplitude or average amplitude are below the amplitude threshold, then class type is set to Barrier in step 115. In a further embodiment, when determining the amplitude, any amplitude contribution from the detection point having the strongest return may preferably be excluded. The discriminating effect of amplitude is increased when strong specular signals are avoided.

If a strong amplitude is found in step 117, then further discriminating tests may be performed in step 118. Thus, a change in the range of the nearest detection point, ΔNear, is compared to a respective threshold and if greater than the threshold, then the class type is set to Barrier in step 115. A stability $Y_{stab}$ of a particular Y value (e.g., $Y_{max}$ or $Y_{min}$) between sample times is compared to a stability threshold, and if greater than the threshold, then the class type is set to Barrier in step 115. If both ΔNear and $Y_{stab}$ are below their respective thresholds, then the class type is set to Vehicle in step 120.

If location type is not On-center in step 113, then a check is made in step 121 to determine whether the location type stored in the record is Rear or Front. If so, then a check is made in step 122 to determine whether the track type is unknown. If unknown, then the class type retains its previous value in step 111 (i.e., if track type is not known for the object during the current sample time then a stationary object cannot be distinguished). If track type is known, then step 123 checks whether the track type is Through. If yes, then the class type is set to Pole in step 124. If track type is not Through, then further discriminating tests may be performed in step 125. Thus, size stability $Size_{stab}$ is compared to a respective size stability threshold and if greater than the threshold, then the class type is set to Clutter in step 126. Stability $Y_{stab}$ of a particular Y value (e.g., $Y_{max}$ or $Y_{min}$) between sample times is compared to a Y-stability threshold, and if greater than the threshold, then the class type is set to Clutter in step 126. If both $Size_{stab}$ and $Y_{stab}$ are below their respective thresholds, then the class type is set to Vehicle in step 120.

If location type is not Front or Rear in step 121, then a check is made in step 127 to determine whether the location type is Spans. If not, then class type is set to its previous value in step 111. Otherwise, a check is made in step 128 to compare size stability $Size_{stab}$ to the respective stability threshold. If less than the threshold then the class type is set to Vehicle in step 120. Otherwise, the class type is set to Clutter in step 126.

Figure 15A:
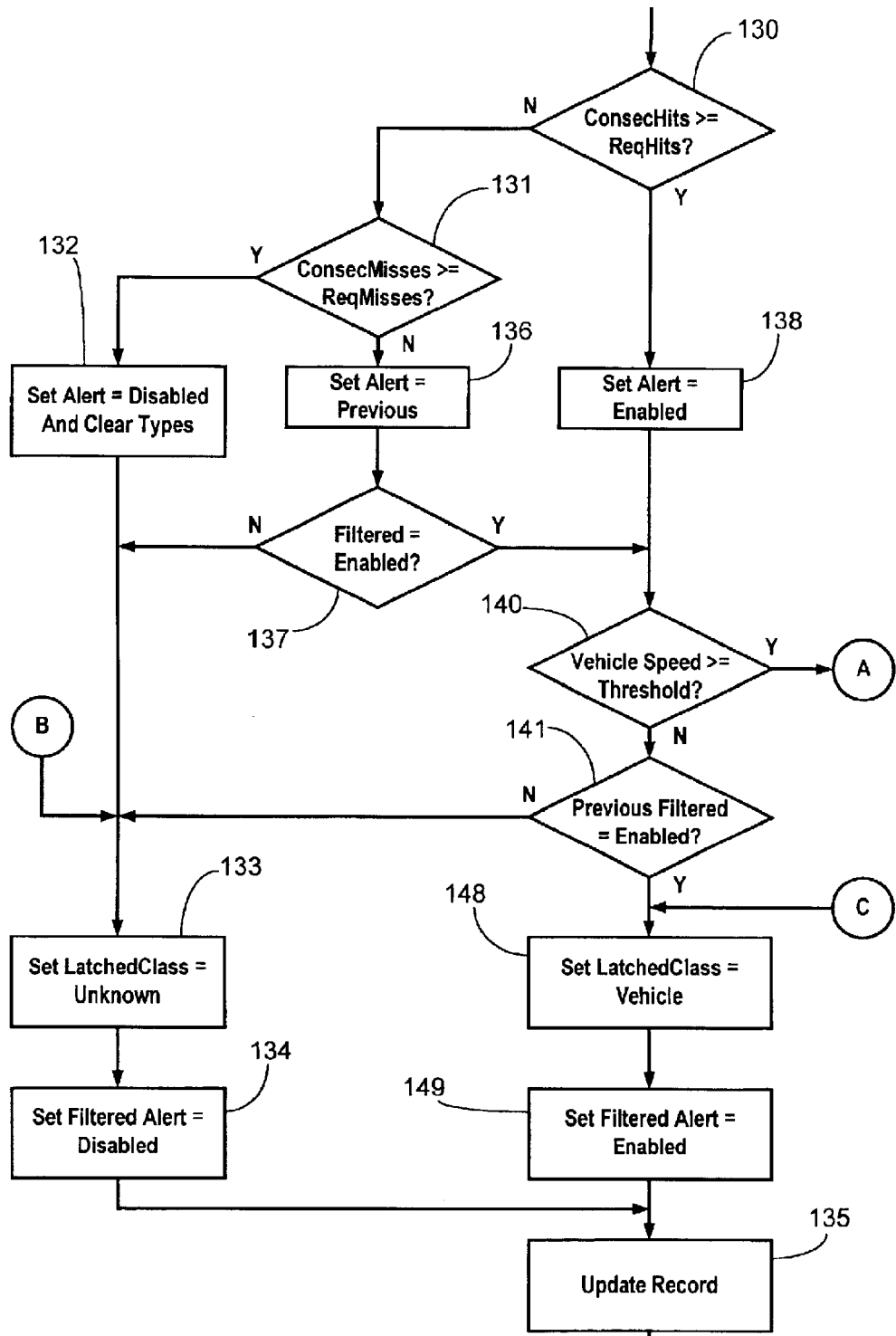
FIGS. 15a and 15b are a flowchart showing a preferred embodiment of the alert processing of the present invention.
Figure 15B:
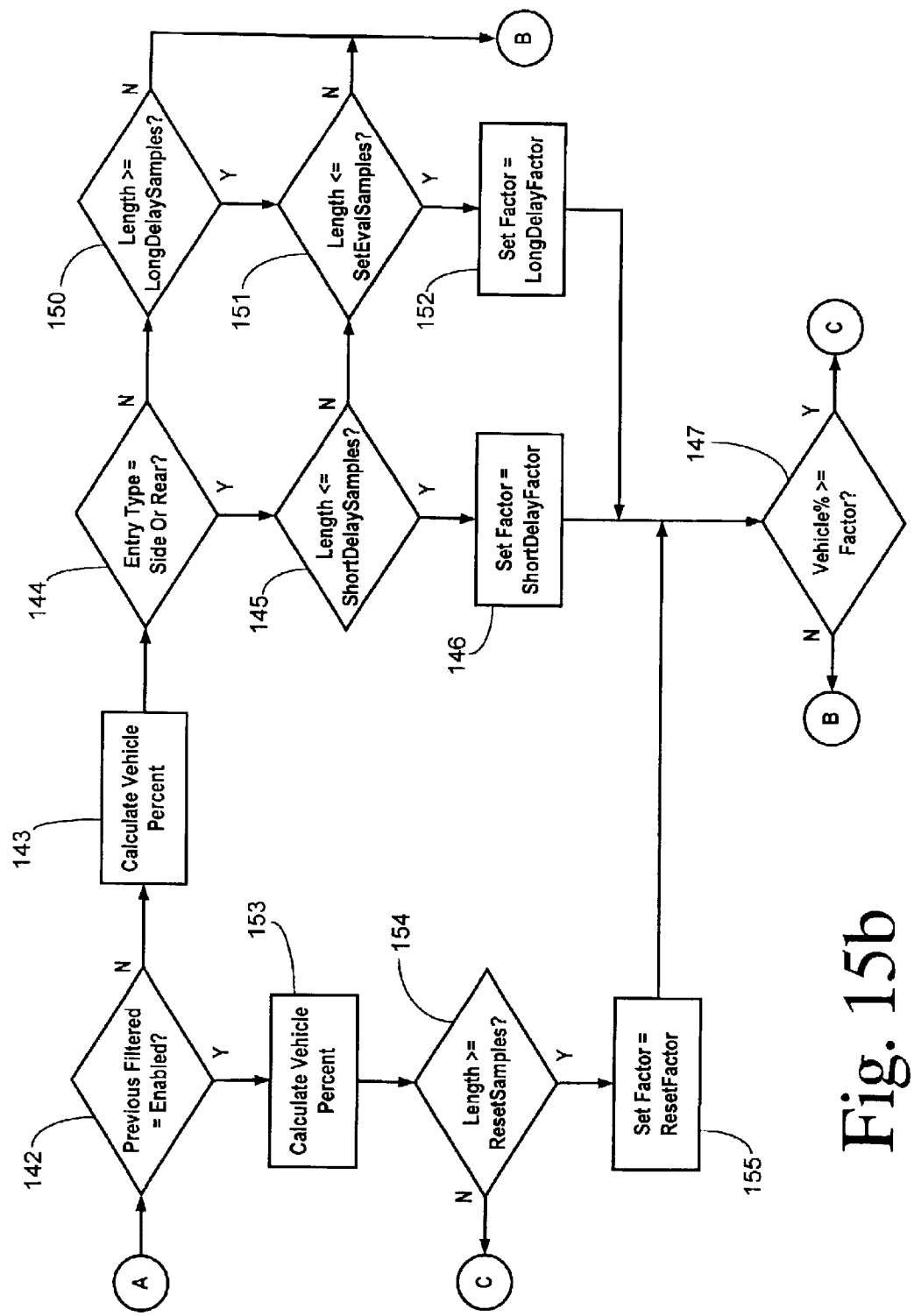

The alert process routine for determining whether or not to initiate an alert to a driver based on the track type and/or the class type is shown in FIGS. 15a and 15b. As used in FIG. 15, a logic variable named Alert has a value of Enabled when an object is present within the zone of interest and a warning should potentially be generated and otherwise has a value of Disabled. A logic variable named Filtered Alert filters out instances when a stationary object is detected and, thus, has a value of Enabled only if a detected object is determined to be a vehicle (e.g., in response to entry type, track type, and/or class type). Furthermore, FIGS. 15a and 15b provide a moving window of class types within a respective observation period such that a decision to call an object a vehicle depends on a percentage of total classifications as having indicated a vehicle within the observation period.

The number of consecutive hits is compared with the number of required hits in step 130. If ConsecHits is not greater than or equal to ReqHits, then consecutive misses is compared with required misses in step 131. If ConsecMisses is greater than or equal to ReqMisses (indicating that any object that may have been present in the past has moved away), then Alert is set to Disabled and all type values are cleared in step 132. A logic variable LatchedClass is set to Unknown in step 133 and Filtered Alert is Disabled in step 134. LatchedClass is used in the preferred method to represent a decision that an object is in fact a vehicle, i.e., corresponding to the current observation period including a selected plurality of sample times and the corresponding individual class types.

If ConsecMisses is not greater than or equal to ReqMisses in step 131, then Alert is set to its previous value in step 136.

A check is made in step 137 to determine whether the previous Filtered Alert is Enabled. If not, then LatchedClass is set to unknown in step 133. Otherwise, vehicle speed is compared with a speed threshold in step 140.

Returning to step 130, if ConsecHits is greater than or equal to ReqHits, then an object is present and the value of Alert is set to Enabled in step 138. Then, vehicle speed is compared with a speed threshold in step 140.

In the embodiment shown in FIG. 15, a driver warning is not always initiated whenever an object is detected in the zone of interest and the host vehicle is not in motion (as opposed to the host status level of FIG. 6), although FIG. 15 can be easily modified to include that function. Instead, vehicle speed is used in the illustrated embodiment to suspend decision making while the host vehicle is stopped. Thus, if vehicle speed is not greater than or equal to a speed threshold, then a check is made to determine whether the previous value of Filtered Alert was Enabled and the alert routine is exited in a manner which makes no changes to any logical variables. Thus, if Filtered Alert was previously Disabled, then the routine is exited via steps 133 and 134; otherwise it is exited via steps 148 and 149.

If vehicle speed is greater than or equal to the speed threshold in step 140, then a check is made in step 142 to determine the previous value of Filtered Alert. If it was Disabled (i.e., a decision has not yet been made to latch an object as a vehicle), then a vehicle percent (Vehicle %) is calculated in step 143. As used herein, Vehicle % means the percentage of times that a class type of Vehicle was detected within a selected number of sample times. The higher the Vehicle %, the higher the confidence that an object in the zone is really a vehicle. A decision to latch the object class as a vehicle is made by comparing the Vehicle % with a threshold. A different threshold is used depending upon the selected length of the observation period or upon the current value of LatchedClass.

For instance, a decision about whether or not to initiate an alert/warning to the driver should be made quickly when an object enters the zone from the side or rear, but more time can be taken to make a determination when the object enters from the front. Thus, in step 144, a check is made to determine whether the entry type for the object is side or rear. If yes (meaning that quick recognition of the presence of a vehicle is needed and that a higher number of false positives can be tolerated), then a Length (e.g., the number of samples included in the observation period and in the Vehicle % calculation) is compared with a predetermined threshold named ShortDelaySamples (e.g., about 5 sample periods). If Length is less than or equal to ShortDelaySamples, then a Factor is set to a ShortDelay-Factor in step 146. ShortDelayFactor may have a value which is liberal in deciding that an object is a vehicle (e.g., in the range of about 40% to about 60%). Vehicle % is compared to the Factor in step 147.

If Vehicle % is less than the factor in step 147, then LatchedClass is set to unknown in step 133 and Filtered Alert is set to Disabled in step 134. If Vehicle % is greater than or equal to the factor in step 147, then LatchedClass is set to Vehicle in step 148 and Filtered Alert is set to Enabled in step 149.

If entry type is not side or rear in step 144 (i.e., the object entered the front region and there is greater time to make a decision), then a check is made in step 150 to determine whether Length has reached a predetermined number of samples LongDelaySamples (e.g., about 30 samples). If yes, then a check is made in step 151 to ensure that Length has not exceeded an especially large number of samples SetEvalSamples. If not exceeded, then Factor is set to a LongDelayFactor in step 152 and the Vehicle % is compared with the LongDelayFactor in step 147. LongDclayFactor can be a more conservative value (e.g., in the range of about 60% to about 80%)

If Length is less than LongDelaySamples in step 150 or is greater than SetEvalSamples in step 151, then a return is made to steps 133 and 134 via point B so that no changes are made to the logical variables LatchedClass or Filtered Alert.

When step 142 determines that the previous value of Filtered Alert is Enabled, then Vehicle % is calculated in step 153. In this case, a decision has already been made to latch a decision that the object is a vehicle. That decision can be continuously reviewed but should not be reversed unless a substantial number of individual samples fail to classify the object as a vehicle. A check is made in step 154 to determine whether Length is greater than or equal to a predetermined number of samples ResetSamples. Once enough samples are available for consideration, Factor is set to a ResetFactor in step 155. For example, ResetFactor may be set at 33% so that over two-thirds of class types would have to be other than Vehicle before a LatchedClass equal to Vehicle would be changed to unknown.

Further embodiments of the present invention could use inputs from a steering wheel sensor to identify instances where a stationary object could enter the detection zone at other than the front region because of turning a tight corner.

Figure 16:
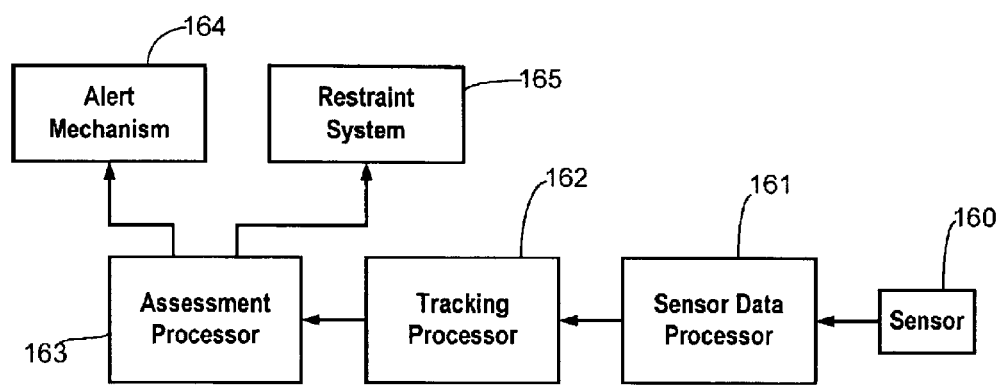
FIG. 16 is a block diagram showing a remote sensing system according to the present invention.

FIG. 16 shows a system block diagram including a sensor 160, such as a radar remote sensor including a lens, antenna, and transceiver, coupled to a sensor data processor 161. Raw sensor data from sensor 160 is processed by processor 161 to determine all detected scatterers within the sensor field-of-view and preferably to create a set of detection points including range, range rate, beam position, return signal strength, and time stamp information for each detection point. This information is provided to a tracking processor 162 and/or an assessment processor 163 that determine at least a location type for each set of detection points and use the location type with other information (such as track type and class type) to assess whether to initiate an alert mechanism 164 which may include visual or audible annunciators of a warning (e.g., a warning light on a dashboard or a warning buzzer). Assessment information can also be provided to a restraint system 165 to facilitate pre-crash actions such as seatbelt pre-tensioning or airbag deployment.

What is claimed is:

1. A method for controlling an object-presence alert in a vehicular side-object detection system in response to a remote sensor for sensing objects in a predetermined zone of interest along side a vehicle, said zone of interest including a front region and a rear region, said remote sensor providing sensor data to generate a set of localized detection points, said method comprising the steps of:

when detection points are sensed in said zone of interest, then collecting a plurality of respective sets of detection points at successive sample times;

for each of said sets of detection points, determining a tracking type of said object within said zone of interest in comparison to a speed of said vehicle and classifying said object as either a moving vehicle or a stationary object in response to said tracking type and in response to locations of said detection points in said zone of interest;

if said object first appeared in other than said front region, then selecting a short observation period including a first predetermined number of sets of detection points and otherwise selecting a long detection period including a second predetermined number of sets of detection points longer than said first predetermined number; and comparing a number of times that said object is classified as a moving vehicle within said selected observation period to a predetermined percentage threshold and initiating said alert if classified as a moving vehicle for greater than said predetermined percentage threshold.

2. The method of claim 1 wherein an initiated alert continues until detection points cease being generated for said zone of interest.

3. The method of claim 1 wherein said step of classifying said object as either a moving vehicle of a persistent stationary object is repeated for subsequent observation periods and wherein an initiated alert is canceled if a subsequent number of times that said object is classified as a moving vehicle is less than a predetermined percentage threshold.

4. The method of claim 1 wherein said predetermined percentage threshold comprises a first value when said short observation period is selected and comprises a second value when said long observation period is selected, wherein said first value is less than said second value.

5. The method of claim 4 wherein said predetermined percentage threshold comprises a third value when said alert is initiated, wherein said third value is less than said first value.

6. The method of claim 1 further comprising, prior to said foregoing steps, the step of:

comparing a speed of said vehicle with a speed threshold and initiating said alert if detection points are generated for an object in said zone of interest and said speed of said vehicle is less than said speed threshold.

7. The method of claim 1 further comprising the step of:

if said object first appeared in other than said front region, then initiating said alert.

8. The method of claim 1 wherein a border between said front region and said rear region is adjusted in response to speed of said vehicle.

9. A method for controlling an object-presence alert in a vehicular side-object detection system in response to a remote sensor for sensing objects in a predetermined zone of interest along side a vehicle, said zone of interest including a front region and a rear region, said remote sensor providing sensor data to generate a set of localized detection points, said method comprising the steps of:

when detection points are generated for an object in said zone of interest, then determining a region where said object first appeared in said zone of interest;

if said object first appeared in said front region, then tracking motion of said object within said zone of interest in comparison to a speed of said vehicle;

foregoing said alert if said tracked motion substantially corresponds to a stationary object;

if said tracked motion does not substantially correspond to a stationary object then classifying said object as either a moving vehicle or a persistent stationary object in response to locations of said detection points in said zone of interest; and initiating said alert if classified as said moving vehicle, otherwise foregoing said alert.

10. A method for controlling an object-presence alert in a vehicular side-object detection system in response to a remote sensor for sensing objects in a predetermined zone of interest along side a vehicle, said zone of interest including a front region, a side region, and a rear region, said remote sensor providing sensor data to generate a set of localized detection points, said method comprising the steps of:

collecting a set of detection points when an object enters said zone of interest;

identifying which of said front, side, or rear regions said object first appeared in; and if said object first appeared in other than said front region, then initiating said alert, otherwise foregoing said alert with respect to said object.

* * * * *